United States Patent
Wu et al.

[11] Patent Number: 6,024,448
[45] Date of Patent: Feb. 15, 2000

[54] CONTACT LENSES BEARING IDENTIFYING MARKS

[75] Inventors: Jongliang Wu; Khaled A. Chehab; Carl G. Crowe; Timothy R. Poling; Richard J. Nason, all of Jacksonville; Jon Scott Walker, Orange Park; Susan-Wendy B. Neadle; Patricia Ann Hutfles, both of Jacksonville; W. Anthony Martin, Orange Park, all of Fla.

[73] Assignee: Johnson & Johnson Vision Products, Inc., Jacksonville, Fla.

[21] Appl. No.: 09/052,433

[22] Filed: Mar. 31, 1998

[51] Int. Cl.⁷ .................................................... G02C 7/04
[52] U.S. Cl. .................. 351/160 R; 351/160 H
[58] Field of Search ............. 351/160 R, 160 H, 351/161–163, 177; 623/6

[56] References Cited

U.S. PATENT DOCUMENTS

| | | | |
|---|---|---|---|
| 2,034,308 | 3/1936 | Morgan | 428/173 |
| 2,803,884 | 8/1957 | Polley | 33/507 |
| 3,971,910 | 7/1976 | Marschallo et al. | 219/121 |
| 4,039,827 | 8/1977 | Zdrok et al. | 250/271 |
| 4,193,671 | 3/1980 | Erickson et al. | 351/160 H |
| 4,194,814 | 3/1980 | Fischer et al. | 351/160 R |
| 4,219,721 | 8/1980 | Kamen et al. | 219/121.85 |
| 4,268,133 | 5/1981 | Fischer et al. | 351/161 |
| 4,406,189 | 9/1983 | Neefe | 82/1.11 |
| 4,441,795 | 4/1984 | Lobdell | 351/169 |
| 4,447,474 | 5/1984 | Neefe | 427/164 |
| 4,457,761 | 7/1984 | Sliger | 8/507 |
| 4,525,044 | 6/1985 | Bauman | 351/160 H |
| 4,543,882 | 10/1985 | Ryer et al. | 101/35 |
| 4,616,910 | 10/1986 | Klein | 351/162 |
| 4,619,504 | 10/1986 | Daniels et al. | 351/163 |
| 4,642,439 | 2/1987 | Miller et al. | 219/121.72 |
| 4,652,721 | 3/1987 | Miller et al. | 219/121.67 |
| 4,744,647 | 5/1988 | Meshel et al. | 351/177 |
| 4,889,421 | 12/1989 | Cohen | 351/162 |
| 4,892,595 | 1/1990 | Holmes | 148/596 |
| 4,921,205 | 5/1990 | Drew et al. | 249/61 |
| 4,976,533 | 12/1990 | Hahn et al. | 351/160 R |
| 5,062,701 | 11/1991 | Drazba et al. | 351/160 R |
| 5,068,514 | 11/1991 | Lunney | 219/121.69 |
| 5,147,585 | 9/1992 | Blum | 264/1.38 |
| 5,170,192 | 12/1992 | Pettigrew et al. | 351/161 |
| 5,219,497 | 6/1993 | Blum | 264/1.38 |
| 5,244,470 | 9/1993 | Onda et al. | 8/507 |
| 5,256,853 | 10/1993 | McIntyre | 219/121.75 |
| 5,294,379 | 3/1994 | Ross et al. | 264/1.36 |
| 5,307,740 | 5/1994 | Yamamoto | 101/44 |
| 5,326,956 | 7/1994 | Lunney | 219/121.69 |

(List continued on next page.)

FOREIGN PATENT DOCUMENTS

| | | |
|---|---|---|
| 0 031 633 B1 | 1/1984 | European Pat. Off. . |
| 0 030 577 B1 | 3/1984 | European Pat. Off. . |
| 0 601 857 A1 | 9/1993 | European Pat. Off. . |
| 0 384 632 B1 | 7/1994 | European Pat. Off. . |
| 25 42 714 A1 | 4/1977 | Germany . |
| 33 16 730 A1 | 8/1984 | Germany . |
| 7-186290 | 12/1993 | Japan . |
| 7-5512 | 7/1996 | Japan . |
| 1 367 846 | 9/1974 | United Kingdom . |
| 1 568 160 | 5/1977 | United Kingdom . |
| 1 583 492 | 6/1977 | United Kingdom . |
| 1 547 525 | 7/1977 | United Kingdom . |
| 2 006 114 | 10/1978 | United Kingdom . |
| 2 026 715 | 4/1979 | United Kingdom . |
| 2 055 694 | 8/1979 | United Kingdom . |
| 84/03569 | 9/1984 | WIPO . |
| 89/07281 | 8/1989 | WIPO . |
| 94/12909 | 6/1994 | WIPO . |
| 94/29071 | 12/1994 | WIPO . |

*Primary Examiner*—Georgia Epps
*Assistant Examiner*—Jordan M. Schwartz
*Attorney, Agent, or Firm*—Anne B. Kiernan

[57] ABSTRACT

This invention provides a contact lens comprising a front surface, a back surface and an identifying mark on at least one of said front surface and said back surface, wherein said identifying mark comprises a depressed region having a cross-section which comprises at least two intersecting concave surfaces at the bottom of said depressed region.

34 Claims, 2 Drawing Sheets

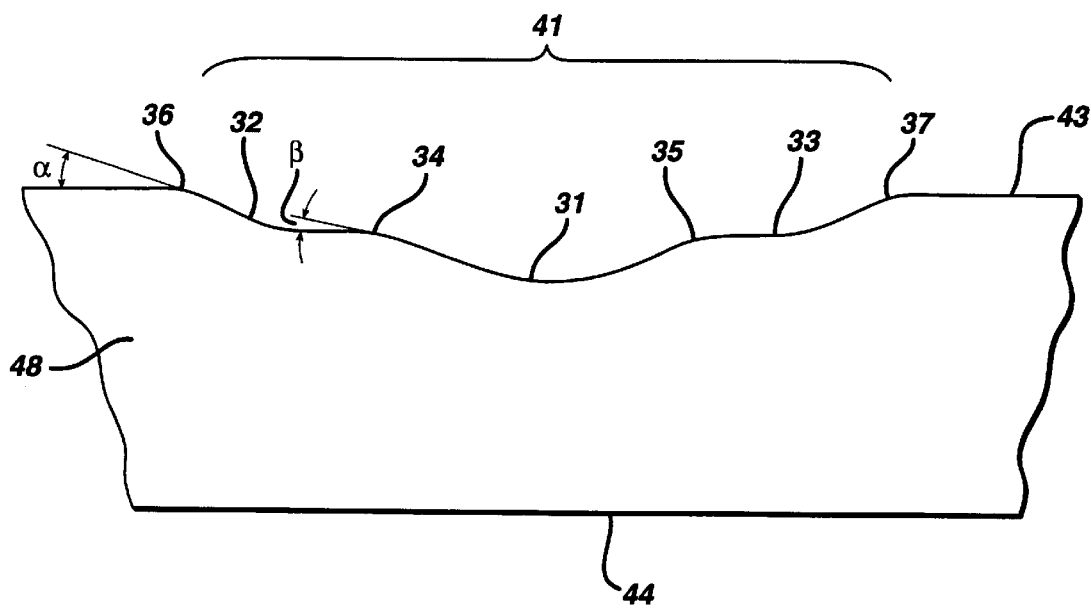

6,024,448

CONTACT LENSES BEARING IDENTIFYING MARKS

FIELD OF THE INVENTION

The present invention is directed to contact lenses bearing an identifying mark or marks with improved comfort and visibility.

BACKGROUND OF THE INVENTION

It is known to put one or more identifying marks on contact lenses. Identifying marks have been disclosed as useful for indicating which contact lens goes into which eye, the top and the bottom of a contact lens, or the back or the front surfaces of a contact lens. Identifying marks have been disclosed as useful for indicating serial numbers, lot and batch numbers, and optical powers. Identifying marks can also be used by optometrists to measure the rotation of a contact lens on the eye, and identifying marks can be used to orient contact lenses by quality control personnel for inspection purposes.

An identifying mark can be a letter e.g., "A," a number, e.g., "3," a symbol, e.g., "*," trademark, e.g. "Acuvue®," and a geometric shape, e.g., "☐," and a homogeneous or heterogeneous group of the one or more of the proceeding list, e.g., "123," and "#A1." The term "identifying mark" is used herein according to this definition.

The prior art discloses many ways to make identifying marks including laser etching and burning as taught in EP 291459 and JP 61223820, and diamond point engraving as disclosed in DE 3316730. Printing techniques, some of which use photosensitive materials which are subjected to UV radiation, are disclosed in GB 200614, DE 3219890, and JP 61211382. Other coloring and dying techniques are disclosed in JP 62186221, JP 2186222, and JP 62250286.

U.S. Pat. No. 5,467,149 discloses that the visibility of an identifying mark cut into an optically clear surface can be improved by making the mark consist of a pattern of regions of varying depth within the boundary of the mark. This patent discloses a mark consisting of stripes cut into the surface of the contact lens, such that the stripes provide a profile having a bottom which is parallel to the surface of the contact lens and sides which are normal to the surface of the contact lens.

DE 3316730 discloses numbering on a soft contact lens consisting of dots which are made by pressing a rounded diamond tip into the contact lens.

U.S. Pat. No. 5,062,701 discloses that lines on a contact lens which are used to measure the rotation of an asymmetric lens can be formed using a dye, by laser etching or by lightly abrasive etching.

There still remains a need to improve the visibility of the identifying marks on contact lenses for the user, while still retaining an acceptable comfort level of the marked contact lenses, and keeping the mark small enough so others do not notice the mark when the contact lens is in the eye.

SUMMARY OF THE INVENTION

This invention provides a contact lens comprising a front surface, a back surface and an identifying mark on at least one of said front surface or back surface, wherein said identifying mark comprises a depressed region, a cross-section of which comprises at least two intersecting concave surfaces at the bottom of said depressed region.

This invention provides a contact lens comprising an identifying mark, which has improved visibility and comfort, because the identifying mark which comprises a depressed region comprising at least two intersecting concave surfaces at the bottom of said depressed region has high visibility, and also can be constructed to be very comfortable for the contact lens wearer.

DESCRIPTION OF THE FIGURES

FIG. 3 is a magnified cross-sectional view of a depressed region of an identifying mark of this invention.

DETAILED DESCRIPTION OF THE INNENTION

Figure 1:
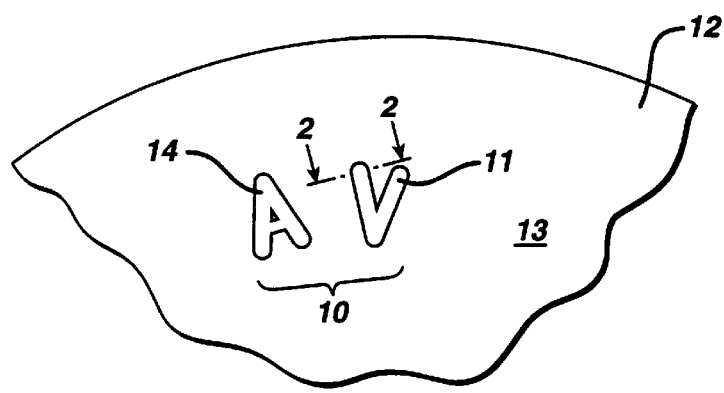
FIG. 1 is a magnified schematic cut-away representation of an identifying mark, "AV" on a contact lens according to this invention.

FIG. 1 shows a magnified schematic representation of an identifying mark, "AV" 10 which is depressed into the surface 13 of a contact lens 12. FIG. 1 shows a continuous depressed region 14 making up the "A" and another continuous depressed region 11 making up the "V". However, the letter(s), number(s) or whatever shape(s) of an identifying mark of this invention can be made up of non-continuous depressed regions, such as dashes and holes. The non-continuous depressed regions are depressed into the surface of the contact lens within or to form the overall shape of the letter(s), number(s) or shape(s) of the identifying mark. The non-continuous depressed regions can be any shape as long as at least some portion of the depressed regions of the identifying mark comprises at least two intersecting concave surfaces located at the bottom of said depressed region. Additional description of non-continuous depressed regions can be found in Wu et al, U.S. patent application Ser. No. 09/052684 entitled "Contact Lens Bearing Mark" (VTN-405) filed concurrently herewith, which is fully incorporated herein by reference.

Figure 2:
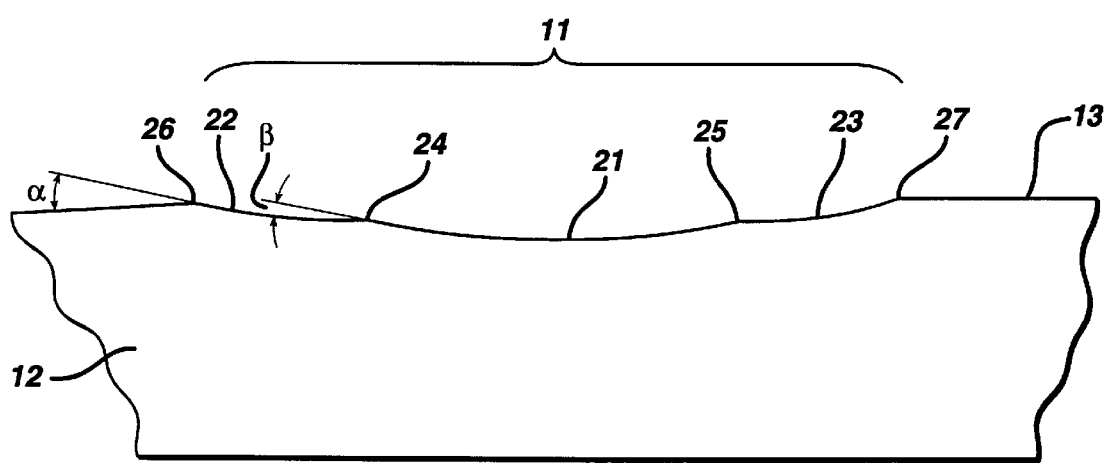
FIG. 2 is a magnified cross-sectional view of the "V" on the contact lens along the line 2—2 shown in FIG. 1.

FIG. 2 shows a magnified cross-sectional view of the depressed region of the "V" along the line 2—2 in FIG. 1. FIG. 2 shows that the depressed region 11 of the "V" is made up of three intersecting concave surfaces at the bottom of the depressed region. The depressed region 11 consists of concave surfaces 21, 22, and 23, all of which face or open towards the surface 13 of the contact lens 12 into which the depressed region is depressed into. The concave surfaces 21 and 22 intersect at the edge 24. The concave surfaces 21 and 23 intersect at the edge 25. The angle β is formed at these edges and is shown at edge 24 in FIG. 2. It is preferred that the overall width or diameter of the cross-section of the depressed region remains constant for the depressed region, and that the depressed region 11 has a substantially rectangular channel shape as seen in a top view shown in FIG. 1; however, the depressed region can have any shape, for example, triangular, square, diamond, circular, or random as long as a cross-section of the depressed region comprises at least two, more preferably at least three, intersecting curved surfaces at the bottom of the depressed regions.

The surface at the bottom of the depressed region comprises intersecting concave surfaces as shown in FIG. 2. As shown in FIG. 2, it is presently preferred that the concave surfaces open or face toward the surface of the contact lens into which the hole is depressed like concave surfaces 21, 22, and 23; however, the concave surfaces may face the opposite surface, or a portion of the concave surfaces at the bottom of the depressed region may face one surface of the contact lens, and a portion of the concave surfaces at the bottom of the depressed region may face the opposite surface of the contact lens. In the latter embodiment, it is preferred that a majority of the concave surfaces at the bottom of the depressed region face the surface that the depressed region is depressed into. The concave surfaces of each depressed region reflect and focus the light that impinges upon the concave surface of the identifying mark, either from the front or back side of the lens. Such focusing of the light reflected off the concave surfaces of the depressed region makes the identifying mark more visible than if the surface of the identifying mark were flat, or randomly roughened. For ease of manufacture, it is preferred that the overall width or diameter of the depressed region of the identifying mark is the same throughout the depressed region of the identifying mark. It is additionally preferred that the cross-section of the depressed region which includes the overall diameter or width of the depressed region, and the size, shape and placement of the concave surfaces in the depressed region of the identifying mark remains constant throughout the depressed region of the identifying mark; however, the concave surfaces of the depressed region may vary in size, depth, and shape throughout the identifying mark.

A depressed region comprises a top and bottom. The top and bottom of the depressed region are contiguous. The top of the depressed region is where the surface of the depressed region typically meets the surface of the contact lens into which the depressed region is depressed. The top of the depressed region can be an edge as shown as edges 26 and 27 in FIG. 2 or the top of the depressed region can be a concave surface facing away from the surface of the contact lens into which the depressed region is depressed. The concave surface can be formed by rounding an edge. A top consisting of a concave surface facing away from the surface of the contact lens into which the depressed region is depressed is shown in FIG. 3 as 36 and 37. The balance of the surfaces of the depressed regions which are not tops 26 and 27 or 36 and 37 in FIGS. 2 and 3 are the bottoms of the depressed regions.

FIG. 3 shows an additional embodiment of the magnified cross-sectional view of a depressed region of the identifying mark of this invention. The depressed region of FIG. 3 comprises more than two intersecting concave surfaces. FIG. 3 shows the concave surfaces 31, 32, 33, 34, and 35 located at the bottom of the depressed region. Concave surfaces 31, 32, and 33 face toward the first surface 43 of the contact lens 48 (which can be either the front or the back surface of the contact lens) into which the depressed region is depressed. Concave surface 34 which is located between concave surfaces 31 and 32, and concave surface 35 which is located between concave surfaces 31 and 33 face toward the second surface 44 of the contact lens 48. Concave surfaces 31, 32, and 33 are much like the concave surfaces 21, 22, and 23, respectively, described in FIG. 2, except that instead of intersecting at an edge, concave surfaces 31, 32, and 33 intersect opposite facing concave surfaces 34 and 35 which provide an exceptionally comfortable transition between concave surfaces 31, 32, and 33. Again, the concave surfaces of the depressed region reflect and focus the light that impinges upon the concave surfaces of the identifying mark. Such focusing of the light reflected off the concave surfaces of the identifying mark makes the identifying mark more visible than if the surface of the identifying mark were flat or had a random shape.

Presently, the identifying mark shown in FIG. 2, where the concave surfaces 21 and 22, and 21 and 23 meet substantially at edges 24 and 25, is preferred because it provides better visibility than the profile shown in FIG. 3, where the upward facing concave surfaces 31, 32 and 33 intersect concave surfaces 34 and 35 which face the opposite surface of the contact lens. It is believed that having the concave surfaces facing in the same direction focuses more of the light in the same direction and results in a brighter and more visible mark.

In the embodiments shown in FIGS. 2 and 3, it is presently preferred that the concave surfaces which face the surface into which the depressed region is depressed, such as concave surfaces 21, 22, and 23 or 31, 32 and 33, are not all of equal radii for better visibility. It is preferred that the radius of curvature for the middle concave surface (or surfaces) is smaller than radius of curvature for the outermost concave surface (or surfaces), for example, concave surface 21 preferably has a smaller radius of curvature than either and preferably both of concave surfaces 22 and 23. The smaller radius of curvature provides more focusing power, while the larger radius of curvature provides more comfort. It is also preferred that when there are more than two concave surfaces at the bottom of the depressed region that at least two of the concave surfaces at the bottom of the depressed region are at differing depths. It is preferred to have an odd number of concave surfaces and to have the middle concave surface at the maximum depth of the depressed region. It is also preferred that the middle concave surface is substantially centered at the mid-point of the depressed region. If there are two additional concave surfaces on either side of the middle concave surface centered at the mid-point, it is preferred that these two concave surfaces are at substantially the same depth, and that the maximum depth of those concave surfaces is preferably less than 80%, more preferably less than 50%, and most preferably less than 30% of the maximum depth of the depressed region. It is preferred that in the embodiment where there are at least three concave surfaces facing the same surface of the contact lens at the bottom of the depressed region, that the width or diameter of the middle concave surface is greater than 50 percent, more preferably greater than 70 percent, most preferably greater than 85 percent of the overall width or diameter of the cross-section of the depressed region. The larger middle concave surface provides enhanced visibility by focusing light, and the concave surfaces on both sides of the middle concave surface provide for comfort.

It is preferred that at least 25%, more preferably at least 50%, most preferably at least 75% of the total surface area of the bottom of the depressed region of the identifying mark has a cross-section comprising at least two intersecting concave surfaces. In the most preferred embodiments greater than 90% of the total surface area of the bottom of the depressed region has a cross-section comprising at least two intersecting concave surfaces, and FIGS. 2 and 3 show embodiments wherein substantially all of the surface of the bottom of the depressed region has a cross-section comprising concave surfaces.

To improve the focusing power of the concave surfaces of the mark, it is preferred that the concave surfaces of the identifying mark are smooth, that is, that the surfaces have a surface roughness preferably less than 10 microns RMS, more preferably less than 3 microns RMS, and most preferably less than 0.5 microns RMS.

When the contact lens is held by the wearer, inspector, or practitioner in ambient light or additional light, the identifying mark of this invention has improved visibility. The unaided human eye sees the bright areas of reflected light off the concave surfaces as bright lines, dots, circles, or other shapes, according to the shape and number of the concave surfaces which typically correspond to the overall shape of the identifying mark.

Contact lenses may be made with identifying marks depressed into the surface of the contact lens by methods well known in the tooling and contact lens field, for example, by using a laser, electrical discharge, mechanical scribing, diamond scribing, ultrasonic scribing, holographic marking, and scattering by surface disruption. The marks can be added to the contact lens after its manufacture, but it is preferred that the marks are added to the contact lens during the manufacture of the contact lens.

In the preferred manufacturing process, durable molds, preferably metal molds are used to make resin molds into which monomers or prepolymers are added and cured to form contact lenses. The durable molds are preferably used multiple times to make a plurality of the resin molds. The durable molds are often constructed of quartz, glass, stainless steel, copper alloy or brass which may additionally have various nickel or nickel alloy plate coatings. The durable molds may be treated via acid etching, laser, electrolysis, diamond scribing, or according to other methods known by those skilled in the field to cut the desired identifying mark into the surface of the durable mold. The durable mold may then be integrated into the injection molding procedures used to make the resin molds. The resin molds are often thermoplastics, or thermosets, preferably polypropylene or polystyrene, and are preferably only used once to make a contact lens. The identifying mark, according to the preferred embodiment will stick out from the surface of the resin mold. When the prepolymer or monomer mix used to make the contact lens is cured between the mold halves during cast molding, or spin casting and cured, the identifying mark from the durable mold which was imprinted onto the resin mold is transferred to the contact lens. The contact lens can comprise any known material useful for making contact lenses. The preferred contact lenses are soft contact lenses which preferably comprise silicone or hydrophilic hydrogels, which are well known to those skilled in the field. In an alternative process, durable molds can be marked with an identifying mark and used directly to produce contact lenses bearing the identifying mark of this invention.

The preferred methods of marking the durable mold used to make the contact lens of the invention is by using lasers, or diamonds, more preferably by using diamonds to scribe the surface of the durable mold. The diamond or diamonds are selected to produce the desired concave surfaces of the depressed region. Multiple diamonds can be used to form concave surfaces having differing radii; however, a single diamond is preferably used, preferably in multiple passes to produce the depressed region of this invention Typically at least one pass of the diamond will be required to form each concave surface in the depressed region of the identifying mark. After the concave surfaces are cut into the durable mold, it is preferred that the identifying mark is polished, for example by orbital polishing, to remove any residual material caused by cutting into the durable mold, which would negatively impact the smoothness of the junction between the surface of the contact lens and the depressed region of the identifying mark. To produce identifying marks having the profiles shown in FIGS. 2 and 3, each of the durable molds was cut by a diamond by a three-step or triple-pass process. In the first step or pass, the diamond cut the middle concave surface at the lowest depth, and in the second and third passes the diamond cut to a lesser depth the two additional concave surfaces on both sides of the middle concave surface. After the diamond cut the durable mold, the mold was polished to remove any residual material, sometimes referred to as slag. The smooth surface is critical for comfort. To form the additional concave surfaces 34, 35, 36 and 37 shown in FIG. 3, the edges formed by the triple pass diamond scribing process were polished to form smooth concave surfaces on the durable mold which formed concave surfaces 34, 35, 36 and 37 on the contact lens.

If a laser is used, the preferred laser is a YAG laser. Lasers can be used with or without masks. Masks limit where on the durable mold the laser's radiation will reach to form the shapes and letters of the mark. It is preferred not to use a mask and to control the laser to cut into the durable mold only in the areas of the mark. Preferably, the laser has a laser beam in which the center of the laser beam has the most energy, and the level of energy drops off toward the circumference of the laser beam, thereby producing a concave shape on the durable mold in a single pulse or pass. Multiple passes of the laser beam over the durable mold can be used to form the multiple concave surfaces, and the intensity of the laser beam can be varied to create the profiles of the depressed region of the identifying mark shown in FIGS. 2 and 3. After laser cutting the durable mold, the mold is preferably polished, to remove any residual material, and if desired to smooth any edges formed particularly by multipass laser burning. Additionally, lasers, e.g. the YAG laser, may be used to directly mark contact lenses with the identifying mark of this invention, although this is not a preferred method.

It is preferred that the depressed region of the identifying mark is depressed into the surface of the contact lens which does not face the cornea, but which faces the eye lid, typically referred to as the front surface of the contact lens. It was further discovered that in embodiments where the diameter or width of at least a portion of the depressed region making up the identifying mark is large enough for the eyelid to feel the identifying mark on the contact lens, presently, it is believed that this diameter or width is about 100 microns or greater, it is preferred that the angle $\alpha$, shown in FIGS. 2 and 3, which is the angle formed at the junction where the surface of the depressed region and the surface of the contact lens meet, that is at the top of the depressed region, is less than 20°, more preferably less than 10°, most preferably less than 7° to increase the comfort of the contact lens bearing the identifying mark on the contact lens. It is even more preferred that the junction where the surface of the depressed region and the surface of the contact lens meet forms a concave surface facing away from the surface of the contact lens into which the identifying mark is depressed having a radius of curvature greater than 30 microns, more preferably greater than 50 microns, and most preferably greater than 80 microns. Further, for identifying marks in which the width or diameter of one or more of the depressed regions is greater than 100 microns, the maximum depth of the depressed region is preferably shallow, for example, from 0.5 to 35 micrometers, more preferably from 5 to 25 microns, and most preferably from 8 to 12 microns. As the diameter or width of the depressed region increases, to improve comfort, it is preferred that the angle $\alpha$ is smaller, and the radii of curvature of the curved surfaces located at the top and bottom of the identifying mark are larger.

In the embodiment shown in FIG. 2 where concave surfaces meet at edges 26 and 27, it is preferred that the angle $\beta$ which is the angle between the concave surfaces as shown in FIG. 2 is less than 12°, more preferably less than 7°, most preferably less than 5°, with the proviso that the angle $\beta$ cannot be 0. It is preferred that angle $\beta$ is smaller than angle $\alpha$. The radii of curvature for the concave surfaces 21, 22, and 23 shown in FIG. 2 are preferably between from 10 to 500 microns, more preferably between from 50 to 300 microns, and most preferably between from 80 to 150 microns.

For the embodiment shown in FIG. 3, the angle α is preferably less than 15, more preferably less than 5 and most preferably less than 3. The radii of curvature of the concave surfaces which face the surface of the contact lens into which the depressed region is depressed are preferably between from 10 to 500 microns, more preferably between from 50 to 300 microns, and most preferably between from 80 to 150 microns. The radii of curvature of the concave surfaces at the bottom of the depressed region which face the opposite surface of the contact lens into which the depressed region is depressed are preferably between from 5 to 300 microns, more preferably between from 20 to 200 microns, and most preferably between from 50 to 120 microns. The angle β for the embodiment shown in FIG. 3 is preferably less than 10°, more preferably less than 5°, and most preferably less than 3°, with the proviso that the angle β cannot be 0.

On the other hand, if the identifying mark has a width or diameter less than 100 microns, preferably less than 90 microns then the eyelid is less sensitive to the shape of the identifying mark, and the angle α can be any size. If the identifying mark is shallow, that is less than 10 microns, then α is preferably 30° to 60° to help form the curved bottom, however, if the identifying mark is deeper, that is from 10 microns to 70 microns, α is preferably from 45° to 90°, more preferably from 60° to 89°, even more preferably from 70° to 85° so that the curved surfaces can be formed at and as the bottom of the identifying mark. For identifying marks in which the width or diameter of one or more of the depressed region is less than 100 microns, more preferably less than 90 microns, the maximum depth of the depressed region is preferably from 10 to 100 micrometers, more preferably 20 and 70 microns, most preferably between 25 to 55 microns.

Note that in FIGS. 2 and 3, the profiles of the depressed regions of the identifying marks on the contact lenses of this invention are shown as being mirror images on both sides of the midpoints of the depressed regions. Although it is preferred that the depressed regions have a mirror-image shape, it is not required.

To get the biggest benefit from the focusing power of the curved surfaces at the bottom of the depressed region of the identifying mark of this invention, it is preferred that the overall diameter or width across the cross-section of the depressed region is between from 10 to 500 microns, more preferably between from 30 to 300 microns, most preferably between from 50 to 200 microns, and that the maximum depth of the depressed region is between from 5 to 80 microns, more preferably between from 10 to 60 microns, most preferably between from 30 to 50 microns. There can be any number of curved surfaces at the bottom of the depressed region across the profile of the depressed region; however, eventually due to the limitations in diameter or width of the depressed region, it is preferred that there are between from 2 to 10 or less, more preferably between from 3 to 8 or less, and most preferably between from 3 to 6 curved surfaces at the bottom of the depressed region. If the diameter or radius of the depressed region is too small or the number of curved surfaces is too large, then the brightness of the identifying mark will not be greatly increased by this invention, because the light will be focused by too many surfaces in too many directions. The most preferred embodiments have 3 or 5 curved surfaces at the bottom of the depressed region as shown in FIGS. 2 and 3.

The cross-section of the concave surfaces at the bottom of the depressed region and at the top of the depressed region can be parabolic, spherical, elliptical or the like, preferably spherical. It is preferred that substantially none of the surface of the depressed region is parallel to, nor perpendicular to the surface of the contact lens.

It is preferred that the overall diameter or width of each depressed region is from about 3 to 30 times the maximum depth of the depressed region, more preferably about 5 to 11 times the maximum depth of the depressed region, and most preferably about 6 to 10 times the maximum depth of the depressed region. It is also preferred that the maximum depth of each depressed region of the identifying mark is located at the center or midpoint of the cross-section of the depressed region, and that the surface of the depressed region from the maximum depth at the midpoint of the depressed region to the surface of the contact lens comprises intersecting curved surfaces, which preferably substantially continuously, more preferably continuously decrease in depth from the midpoint of the cross-section of the depressed region to the surface of the contact lens.

Unless specially designed for optometrists'use, the overall size of the identifying mark on the contact lens is preferably such that the identifying mark will not be noticeable on the contact lens by an ordinary observer from a foot or more away; therefore, it is preferred that the identifying mark possesses an overall width, which is, for example, the distance across the A and V of the "AV" identifying mark shown in FIG. 1, of less than 10 millimeters, more preferably from between 0.5 to 7 millimeters, most preferably from 2 to 5 millimeters, and it is preferred that the identifying mark possesses an overall length, which is, for example, the distance from the top to bottom of the A of the "AV" identifying mark shown in FIG. 1, of less than 5 millimeters, more preferably between from 0.5 to 3 millimeters, most preferably 1.2 to 1.8 millimeters.

This invention has been described with reference to particular preferred embodiments. Additional embodiments which fall within the scope of the following claims will be apparent to those of ordinary skill in the art.

We claim:

1. A contact lens comprising a front surface, a back surface and an identifying mark on at least one of said front surface and said back surface, wherein said identifying mark comprises a depressed region having a top and a bottom, said top of said depressed region being where the surface of said depressed region meets the surface of either said front surface or said back surface of said contact lens, the remainder of the surface of said depressed region being said bottom of said depressed region, wherein for at least 50 percent of the total surface area of said bottom of said depressed region, a cross-section of said depressed region comprises at least two intersecting concave surfaces, and said intersecting concave surfaces form an angle β, with the proviso that said angle β cannot be 0, and further wherein said cross-section comprises an overall width or diameter and maximum depth.

2. The contact lens of claim 1 wherein said identifying mark comprises a letter, number or shape, and further wherein said depressed region of said letter, number or shape is a continuous depressed region.

3. The contact lens of claim 1 wherein the overall width or diameter of said cross-section of said depressed region is substantially constant.

4. The contact lens of claim 3 further wherein said at least two intersecting concave surfaces have substantially constant radii of curvature.

5. The contact lens of claim 1 wherein said depressed region comprises at least three intersecting concave surfaces.

6. The contact lens of claim 1 wherein said intersecting concave surfaces face the front surface.

7. The contact lens of claim 1 wherein at least one of said intersecting concave surfaces faces the front surface, and at least one of said intersecting concave surfaces faces the back surface.

8. The contact lens of claim 1 wherein said intersecting concave surfaces form an edge between said intersecting concave surfaces.

9. The contact lens of claim 1 wherein said angle β formed by said intersecting concave surfaces is less than 12°, with the proviso that β cannot be 0°.

10. The contact lens of claim 1 wherein the surface roughness of said concave surfaces is less than 10 microns RMS.

11. The contact lens of claim 1 further wherein said top of said depressed region is an edge.

12. The contact lens of claim 1 further wherein said top of said depressed region is a concave surface.

13. The contact lens of claim 1 wherein said maximum depth of said depressed region is located at the midpoint of said cross-section of said depressed region.

14. The contact lens of claim 1 wherein said intersecting concave surfaces of said depressed region are located at various depths below the surface of said contact lens.

15. The contact lens of claim 1 wherein at least two of said intersecting concave surfaces have different radii of curvature.

16. The contact lens of claim 1 wherein said intersecting concave surfaces are formed by a method comprising the step of mechanically scribing a mold.

17. The contact lens of claim 1 wherein said maximum depth of said cross-section of said depressed region is between from 5 to 80 microns.

18. The contact lens of claim 1 wherein said maximum depth of said cross-section of said depressed region is between from 10 to 60 microns.

19. The contact lens of claim 1 wherein the shape of said intersecting concave surfaces is substantially hyperbolic, elliptical, parabolic or spherical.

20. The contact lens of claim 1 wherein the overall width or diameter of said cross-section is between from 10 to 500 microns.

21. The contact lens of claim 1 wherein the overall width or diameter of said cross-section is between from 30 to 300 microns.

22. The contact lens of claim 1 wherein the overall width or diameter of said depressed region is greater than 100 microns, said depressed region further comprises an angle α formed where the surface of the depressed region meets the surface of either said front surface or said back surface of said contact lens, said angle α is less than 20°.

23. The contact lens of claim 1 wherein the overall width or diameter of said depressed region is greater than 100 microns and the radius of curvature at the top of said depressed region is greater than 30 microns.

24. The contact lens of claim 1 wherein said overall diameter or width of said depressed region is from 3 to 30 times the maximum depth of said depressed region.

25. The contact lens of claim 1 wherein said overall diameter or width of said depressed region is from 5 to 11 times the maximum depth of said depressed region.

26. The contact lens of claim 7 wherein the radii of curvature of said at least one concave surface facing the front surface is between from 10 to 500 microns, and of said at least one concave surface facing the back surface is between from 5 to 300 microns.

27. The contact lens of claim 1 wherein said depressed region comprises an odd number of intersecting concave surfaces, and the middle concave surface has the smallest radius of curvature.

28. The contact lens of claim 27 wherein the width or diameter of said middle concave surface comprises greater than 50 percent of the overall width or diameter of said depressed region.

29. The contact lens of claim 1 wherein greater than 75 percent of the surface area of said depressed region comprises said cross-section.

30. The contact lens of claim 1 wherein said cross-section has from 3 to 8 of said intersecting concave surfaces.

31. A contact lens comprising a front surface, a back surface and an identifying mark on at least one of said front surface and said back surface, wherein said identifying mark comprises a depressed region having a diameter or width greater than 100 microns, said depressed region further comprises an angle α formed where the surface of the depressed region meets the surface of either said front surface or said back surface of said contact lens, said angle α is less than 20°.

32. The contact lens of claim 31 wherein said angle α is less than 10°.

33. A contact lens comprising a front surface, a back surface and an identifying mark on at least one of said front surface and said back surface, wherein said identifying mark comprises a depressed region having a diameter or width greater than 100 microns, further wherein said depressed region comprises a top where the surface of the depressed region meets the surface of either said front surface or said back surface of said contact lens, and the radius of curvature at the top of said depressed region is greater than 30 microns.

34. The contact lens of claim 33 wherein said radius of curvature is greater than 50 microns.

* * * * *